United States Patent
Katz et al.

(10) Patent No.: US 12,155,694 B2
(45) Date of Patent: Nov. 26, 2024

(54) PHISHING DETECTION USING HTML

(71) Applicant: Check Point Software Technologies Ltd., Tel Aviv (IL)

(72) Inventors: Natan Katz, Tel Aviv (IL); Raphael Lior Gozlan, Herzelia (IL); Dor Livne, Tel Aviv (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 246 days.

(21) Appl. No.: 17/936,878

(22) Filed: Sep. 30, 2022

(65) Prior Publication Data

US 2024/0114053 A1 Apr. 4, 2024

(51) Int. Cl.
*G06F 21/00* (2013.01)
*H04L 9/40* (2022.01)
*H04L 29/06* (2006.01)
*H04L 41/16* (2022.01)

(52) U.S. Cl.
CPC .......... *H04L 63/1483* (2013.01); *H04L 41/16* (2013.01)

(58) Field of Classification Search
None
See application file for complete search history.

(56) References Cited

PUBLICATIONS

Aljofey et al. "An effective detection approach for phishing websites using URL and HTML features", Scientific Reports vol. 12, Article No. 8842 Apr. 2022, pp. 1-19 (Year: 2022).*
Li et al. A stacking model using URL and HTML features for phishing webpage detection, Future Generation Computer Systems vol. 94, May 2019, pp. 27-39 (Year: 2019).*

* cited by examiner

*Primary Examiner* — Lisa C Lewis
(74) *Attorney, Agent, or Firm* — Renner, Otto, Boisselle & Sklar, LLP

(57) ABSTRACT

A device, system, and method are provided for detecting an email phishing attack by training graph neural network to detect phishing emails based on hypertext markup language (HTML) tags and cascading style sheets (CSS) included in an email. Noise is added during the training of the graph neural network to make the trained graph neural networks more robust against small changes in the training data.

20 Claims, 4 Drawing Sheets

PHISHING DETECTION USING HTML

TECHNICAL FIELD

The present disclosure relates generally to computer security and more particularly to detecting and protecting against email based malicious attacks.

SUMMARY

Hypertext markup language (HTML) tags are often used in email phishing attacks to confound genuine users. For example, malicious parties use HTML tags to direct users to webpages controlled by the malicious party, where the user is tricked into divulging their information (e.g., username and password). Because the modus operandi for malicious parties commonly relies on the handling of HTML tags, these tags can be used as informative features for detecting phishing attacks.

Phishing emails are challenging for machine learning (ML) tools, because production traffic is significantly imbalanced, phishing methodologies change rapidly causing high temporality due to label aging in the training data, and raw data contains many arguments such as text, tabular data, and HTML (e.g., which can be difficult to combine).

The present disclosure provides an electronic device for analyzing HTML tags included in an email by extracting a graph structure of these HTML tags, and using deep learning (DL) tools for detecting phishing attacks in received emails.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
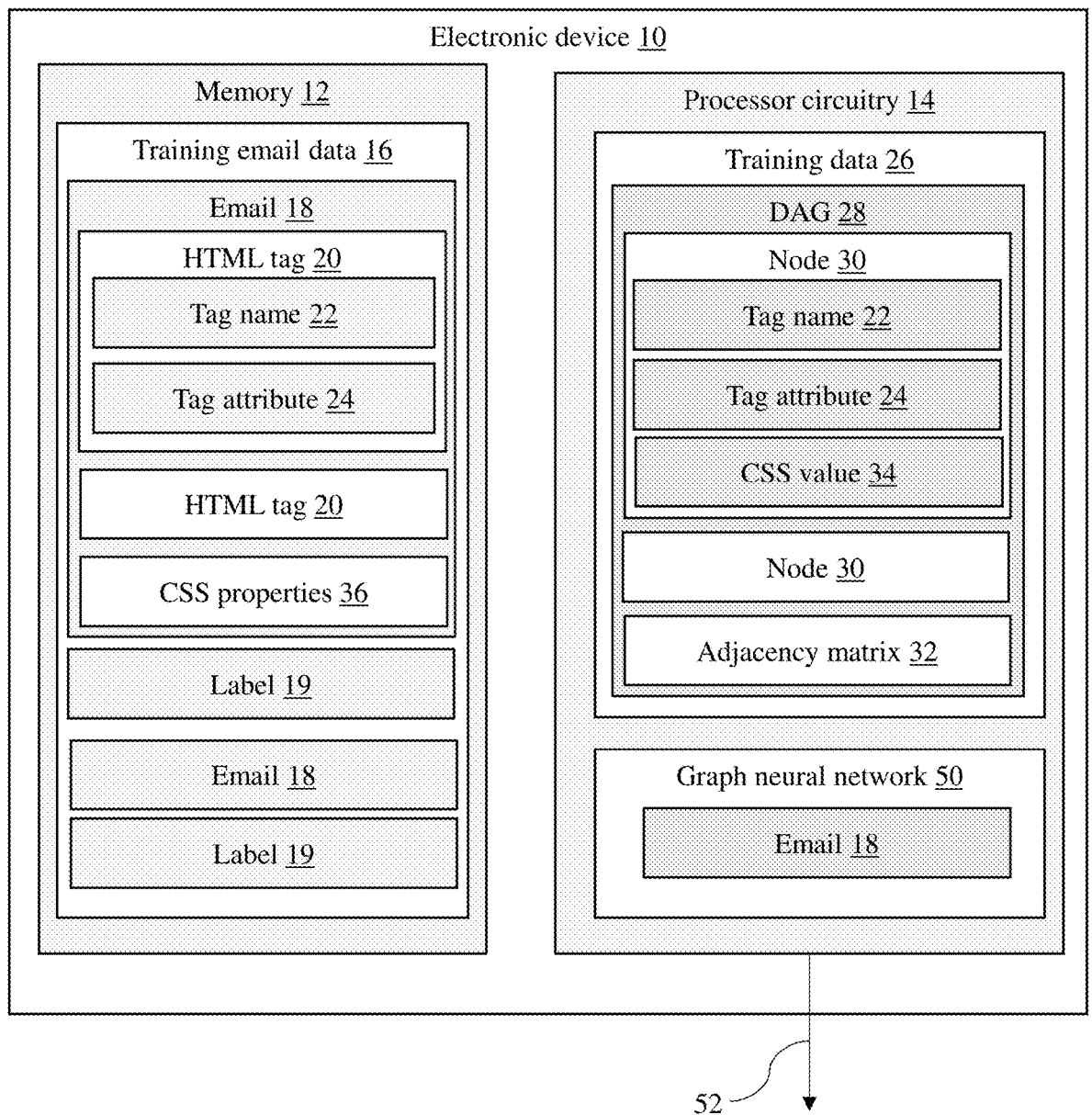
FIG. 1 is a block diagram of an embodiment of an electronic device for detecting email phishing using deep learning.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

In email phishing attacks including HTML, the phishing attacks are temporary. That is, the same combination of HTML tags often appears simultaneously in many emails or websites for a fixed time duration before disappearing. This phenomenon may lead to time overfitting.

The present disclosure provides a device, system, and method for detecting an email phishing attack by training graph neural network to detect phishing emails based on hypertext markup language (HTML) tags and cascading style sheets (CSS) included in an email. Noise is added (e.g., according to Stochastic Gradient Langevin Descent) during the training of the graph neural network to make the trained graph neural networks more robust against small changes in the training data.

According to a general embodiment shown in in FIG. 1, an electronic device 10 is presented for detecting an email phishing attack using deep learning. The electronic device 10 includes a memory 12 and processor circuitry 14. The memory 12 stores training email data 16 including emails 18 and an associated label 19 (identifying the email as a phishing email or a non-phishing email). The emails 18 include hypertext markup language (HTML) tags 20 having a hierarchal structure. The HTML tags 20 include a tag name 22 and one or more tag attributes 24. The processor circuitry 14 generates training data 26 including the training email data 16. The processor circuitry 14 stochastically trains one or more graph neural networks 50 using the generated training data 26, such that when the graph neural network(s) 50 are applied to an email 18, the graph neural network(s) 50 output a label 52 for the email 18 as a phishing email or a non-phishing email. The trained graph neural network(s) may be any suitable number of graph neural networks. For example, a single graph neural network may be trained. The graph neural network(s) may similarly be any suitable graph neural network. For example, the graph neural network may be a graph convolutional network.

Noise is added during the training of the graph neural network(s) 50, such that the trained graph neural network(s) 50 are more robust against small changes in the training data 26. As is described in further detail below, the noise may be added according to Stochastic Gradient Langevin Descent (SGLD). The processor circuitry 14 also receives a testing email 18 having HTML tags 20, applies the one or more trained graph neural networks 50 to the testing email 18, and outputs the label 52 for the testing email 18 as a phishing email or a non-phishing email.

When generating the trained graph neural network(s), for each of the emails 18 included in the training email data 16, the processor circuitry 14 generates from the HTML tags 20 of the email 18 a directed acyclic graph (DAG) 28 including nodes 30 and an adjacency matrix 32. Each node 30 represents an HTML tag 20 of the email 18 and includes the tag name 22 of the represented HTML tag 20, the tag attributes 24, and a cascading style sheets (CSS) values 34. The CSS values 34 are determined based on CSS properties 36 of the email 18. The processor circuitry 14 also determines the adjacency matrix 32 of the DAG 28 by parsing the HTML tags 20 of the email 18 to form a parse tree 38. The adjacency matrix represents the DAG as a matrix of elements indicating whether pairs of nodes are adjacent or not in the DAG. The adjacency matrix 32 is a matrix of elements 40 with each of the elements 40 representing two of the nodes 30 of the DAG 28 as a node pair. Each of the elements 40 has a value 42 indicating whether the two nodes 30 of the node pair represented by the element 40 are adjacent or not adjacent. Two nodes 30 of a node pair are adjacent when both nodes 30 are connected in the parse tree 38.

HTML tags 20 imply hierarchal structure over scripts containing the tags. The HTML tags 20 included in the email includes information such as tag names 22, tag attributes 24, and values of the tag attributes. This hierarchal structure may be either disconnected or connected with an orientation that may be presented as a directed acyclic graph (DAG) 28. Such a graph 28 may be presented using standard code packages such as BeatifulSoup. In this way, the HTML tags 20 from an email 18 may be used to generate a graph 28 with a set of properties for each node 30 of the graph 28 and with an (often-sparse) adjacency matrix 32. By applying machine learning (ML) engines to this graph, the email can be classified.

Figures 2, 3:
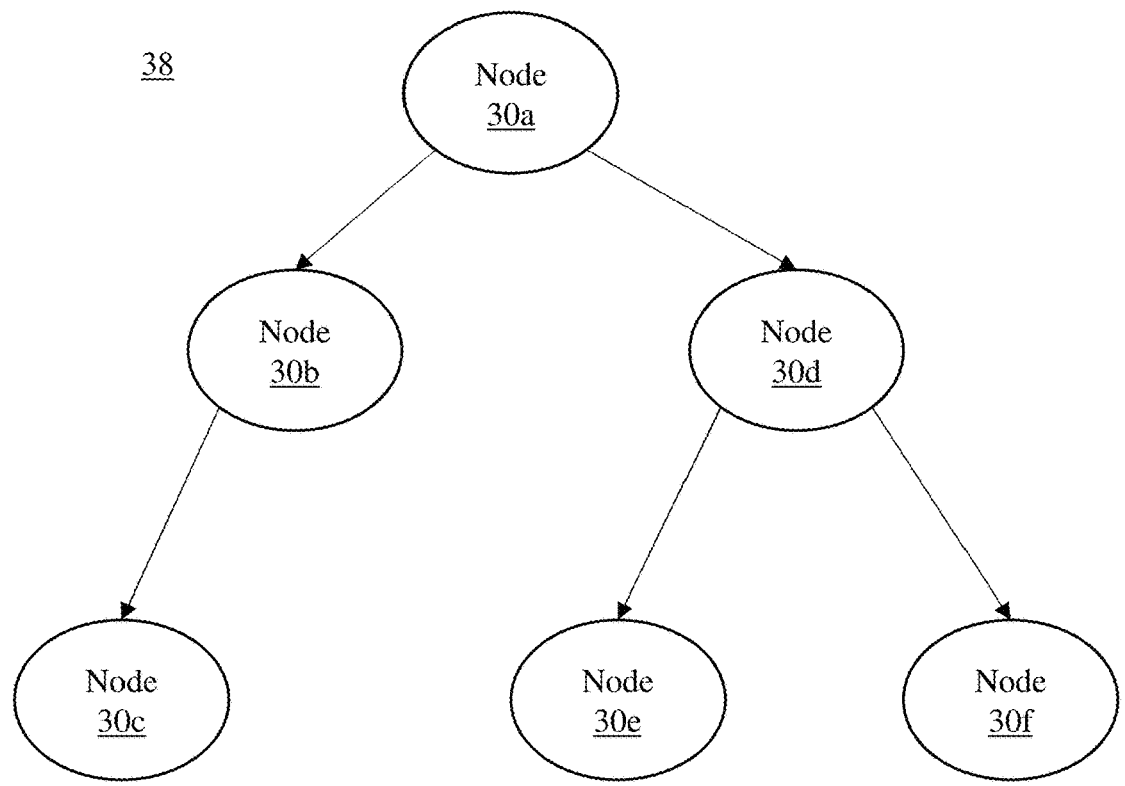
FIG. 2 is a block diagram of a directed acyclic graph.
FIG. 3 is a diagram of an adjacency matrix for the directed acyclic graph of FIG. 2.

A DAG 28 is a directed graph without directed cycles. That is, the graph 28 consists of nodes 30 (also referred to as vertices) and edges (also called arcs), with each edge directed from one node 30 to another, such that following the edges does not form a closed loop. A directed graph is a DAG if it can be topologically ordered, by arranging the nodes 30 as a linear ordering that is consistent with all edge directions. An exemplary graph 28 is shown in FIG. 2. In FIG. 2, connected nodes 30 are represented by circles and are connected via a line. A corresponding adjacency matrix 32 is shown in FIG. 3. In the adjacency matrix 32, connected nodes 30 are identified with an "X".

The above-described CSS value 34 may be determined based on whether CSS is provided for the email 18. CSS is a style sheet language used for describing the presentation of a document written in a markup language such as HTML or XML. Emails including HTML often also include CSS for adding style to the emails. This styling is often used by malicious actors to trick email recipients into divulging confidential information (e.g., usernames and passwords). A CSS value 34 may be assigned to the nodes 30 based on whether CSS is missing altogether, whether CSS is embedded in the email 18 (e.g., embedded in the HTML of the email 18), whether CSS is included in the email separate from an HTML document of the email 18 (i.e., the email contains both HTML and CSS), or whether the CSS is incorporated by reference (e.g., the CSS is referenced in the HTML document using a URL address). If the CSS is referenced by a URL, the CSS may be resolved by looking up the URL to obtain the CSS and then using the obtained CSS to compute the CSS values. In this way, the variable may be a four-categorical variable as follows: 0 for no CSS; 1 for CSS provided within a URL address; 2 for CSS provided in text; or 3 for all other circumstances. Based on the foregoing, the node structure of the graph may be (1) tag, (2) one or more attributes, and (3) CSS modified values. When an HTML tag includes multiple attributes, the attribute of the node associated with the HTML tag may be determined by embedding the attributes over a truncated scale (e.g., injecting a vector of the attributes to an embedding engine that embeds the entirety of the attributes). Alternatively, the attributes may be prioritized and a subset of the attributes may be embedded.

The generated training data 26 is used to stochastically train the graph neural network(s) 50. For example, the nodes 30 and adjacency matrix 32 may be analyzed using a graph convolutional network (GCN) mechanism. A graph neural network (GNN) is a deep learning (DL) architecture that learns graph structure in several ways such as learning graph's real presentation (embedding), or mapping graphs to a categorical set (i.e., classifying graphs). For example, the graph neural network(s) 50 may receive as an input a list of nodes 30 and their adjacency matrix 32 (also referred to as the graph neural network(s) being applied to the graph 28 of the email). The graph neural network(s) 50 may output a probability of the email being a phishing attack. That is, the label 52 output by the graph neural network(s) 50 may indicate a probability of the email being a phishing email. In one embodiment, the label 52 may indicate a probability of the email being a phishing email, a spam email, or a malicious email. For example, the outputted label 52 may be a single probability (e.g. probability that the email is a phishing email) or a vector of probabilities (e.g., one probability for each potential class). When the output label 52 is a single probability, the label 52 may identify the classification having the highest probability.

As described above, time overfitting may be addressed in the trained graph neural network(s) 50 by adding stochasticity during training. For example, a graph model may be trained using Stochastic Gradient Langevin Descent (SGLD) or using Bayesian layers to replace the maximum posterior approach (MAP) with a stochastic engine that samples weights in the inference to reduce overfitting.

Stochastic gradient Langevin dynamics (SGLD) is an optimization and sampling technique composed of characteristics from stochastic gradient descent and Langevin dynamics. Like stochastic gradient descent, SGLD is an iterative optimization algorithm which uses mini-batching to create a stochastic gradient estimator to optimize a differentiable objective function. In SGLD, the likelihood gradient terms are mini-batched and samples are produces from a posterior distribution of parameters based on available data. The following disclosure is hereby incorporated by reference in its entirety: Welling, M., & Teh, Y. W. (2011). Bayesian learning via stochastic gradient Langevin dynamics. In Proceedings of the 28th international conference on machine learning (ICML-11) (pp. 681-688).

While training using SGLD, each neuron of a neural network may be assumed to have a distribution function including parameters that is trained with a maximum a posteriori (MAP) approach. As the differentiable objective function decreases, noise may be added to the gradient. By adding noise, the trained neural network loses optimality but is more robust against small changes in the data as email phishing campaigns are changed.

In one embodiment, a time-based weight is applied to the training data, such that the training emails included in the training data having an earlier sent date has a smaller effect on the training of the one or more graph neural networks than the training emails having a more recent sent date. For example, training emails sent before a date threshold may not be included in the training data. As an example, the date threshold may be six months prior to a current date. In this way, older emails may not be used in the training of the graph neural network(s). New trained graph neural network(s) may be generated periodically to account for new training email data and to discount the effect of older emails on the trained graph neural network(s). Upon training new graph neural network(s) the newly trained graph neural networks may be used in place of the previously trained graph neural network(s).

The processor circuitry 14 may have various implementations. For example, the processor circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 14 may be located on one or more discrete and separate pieces of hardware. The processor circuitry 14 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 14. The processor circuitry 14 may be communicatively coupled to the computer readable medium and communication interface through a system bus, mother board, or using any other suitable structure known in the art.

The memory 12 may be any suitable computer readable medium, such as one or more of a buffer, a flash memory, a hard drive, a removable media, a volatile memory, a non-volatile memory, a random-access memory (RAM), or other suitable device. In a typical arrangement, the memory 12 may include a non-volatile memory for long term data storage and a volatile memory that functions as system memory for the processor 16. The memory 12 may exchange data with the processor circuitry 14 over a data bus. Accompanying control lines and an address bus between the memory 12 and the processor circuitry 14 also may be present. The memory 12 is considered a non-transitory computer readable medium.

Figure 4:
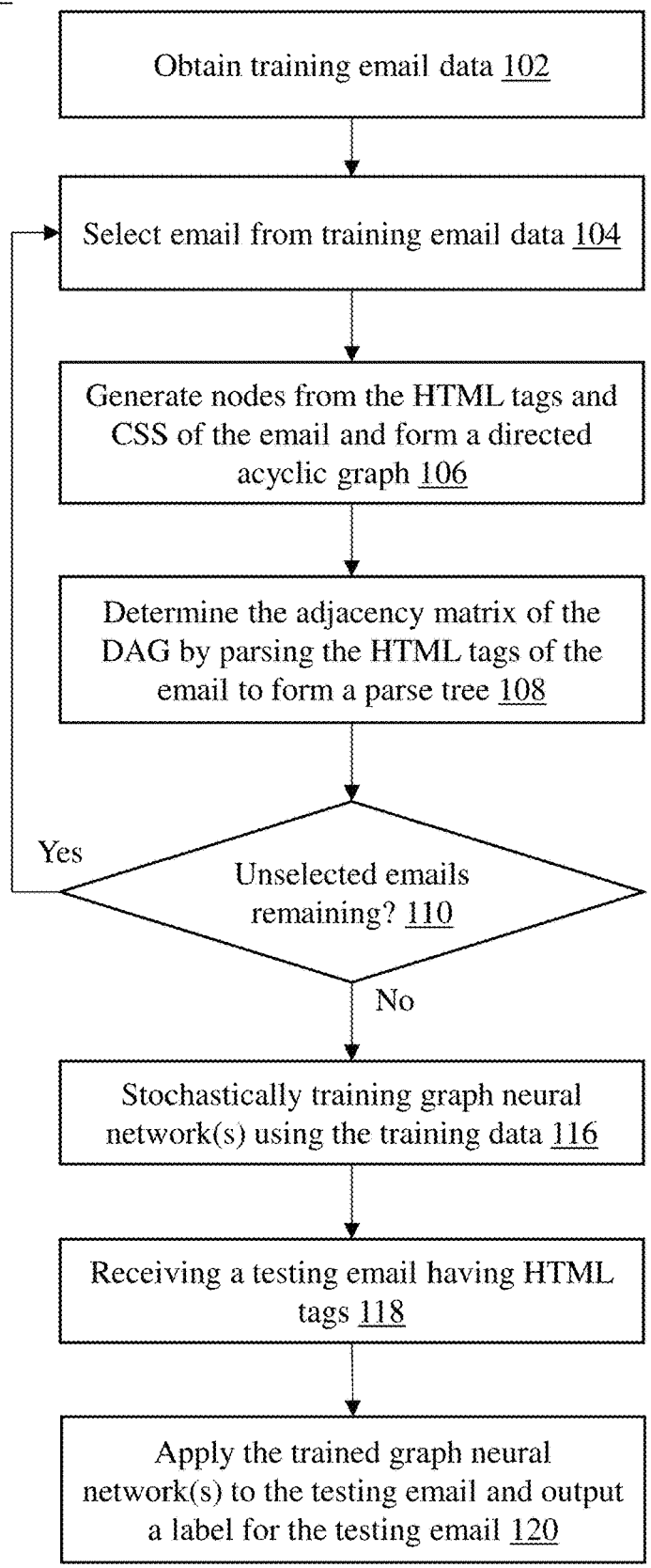
FIG. 4 is a flow diagram of an embodiment of a method for detecting email phishing using deep learning.

In the embodiment depicted in FIG. 4, a method 100 implemented by the processor circuitry 14 is shown for detecting email phishing using deep learning. In step 102, training email data 16 is obtained by the processor circuitry 14. As described above, the training email data 16 includes emails labeled as a phishing email or a non-phishing email. In steps 104, 106, 108, and 110, training data 26 is generated including the training email data 16.

In step 104, an email 18 is selected from the training email data 16. In step 106, a DAG 28 is generated from the HTML tags 20 of the email 18. In step 108, the adjacency matrix 32 of the DAG 28 is determined by parsing the HTML tags 20 of the email 18 to form a parse tree. In step 110, a check is performed for remaining unselected emails 18 in the training email data 16. If there are remaining unselected emails 18, then processing returns to step 104. If there are no remaining unselected emails 18, then processing moves to step 112.

In step 112, the generated training data 26 is used to stochastically train graph neural network(s), such that when the one or more graph neural networks is applied to an email, the one or more graph neural networks outputs a label for the email as a phishing email or a non-phishing email. In step 118, a testing email is received having HTML tags 20. In step 120, the trained graph neural network(s) 50 are applied to the testing email 18 and a label 52 is output for the testing email as a phishing email or a non-phishing email.

Figure 5:
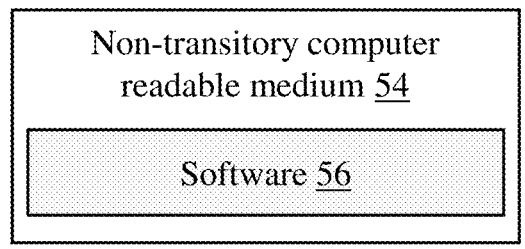
FIG. 5 is a block diagram of an embodiment of a non-transitory computer readable medium storing software for detecting email phishing using deep learning.

Turning to FIG. 5, a non-transitory computer readable memory 54 is shown having software 56 embodied thereon for detecting email phishing using deep learning. The executing of the software 56 may cause the processor circuitry 14 to perform the actions, operations, and method steps described above. The memory 54 may be any non-transitory computer readable medium suitable for storing software 56.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method implemented by processor circuitry for detecting email phishing using deep learning, the method comprising:
    obtaining training email data including emails labeled as a phishing email or a non-phishing email, wherein:
        the emails include hypertext markup language (HTML) tags having a hierarchal structure; and
        the HTML tags include a tag name and a tag attribute;
    generating training data including the training email data by, for each of the emails included in the training email data:
        generating from the HTML tags of the email a directed acyclic graph (DAG) including nodes and an adjacency matrix, wherein:
            each node represents an HTML tag of the email and includes the tag name of the represented HTML tag, the tag attribute, and a cascading style sheets (CSS) value; and
            the CSS value is determined based on CSS properties of the email; and
        determining the adjacency matrix of the DAG by parsing the HTML tags of the email to form a parse tree, wherein:
            the adjacency matrix is a matrix of elements with each of the elements representing two of the nodes of the DAG as a node pair;
            each of the elements has a value indicating whether the two nodes of the node pair represented by the element are adjacent or not adjacent; and
            two nodes of a node pair are adjacent when both nodes are connected in the parse tree;
    stochastically training one or more graph neural networks using the generated training data, such that when the one or more graph neural networks is applied to an email, the one or more graph neural networks outputs a label for the email as a phishing email or a non-phishing email, wherein:
        noise is added during the stochastic training of the one or more graph neural networks, such that the trained one or more graph neural networks are more robust against small changes in the training data;
    receiving a testing email having HTML tags; and
    applying the one or more trained graph neural networks to the testing email and outputting the label for the testing email as a phishing email or a non-phishing email.

2. The method of claim 1, wherein the CSS value is based on whether CSS is provided for the email and, when CSS is provided for the email, whether CSS is provided as a URL address, as text, or in another manner.

3. The method of claim 1, wherein:
    the non-phishing emails of the training email data are labeled as an identified class selected from a set of two or more potential classes;
    the trained one or more graph neural networks outputs a label for the email as a phishing email or a specific class of the set of two or more potential classes; and
    the applying of the one or more trained graph neural networks to the testing email results in the outputting of the label for the testing email as a phishing email or one of a specific class of the set of two or more potential classes.

4. The method of claim 3, wherein the label output by the one or more graph neural networks indicates a probability of the email being at least one of a phishing email or at least one of the set of the two or more potential classes.

5. The method of claim 1, wherein the label output by the one or more graph neural networks indicates a probability of the email being a phishing email.

6. The method of claim 1, further comprising applying a time-based weight to the training data, such that the training emails included in the training data having an earlier sent date have a smaller effect on the training of the one or more graph neural networks than the training emails having a more recent sent date.

7. The method of claim 6, wherein training emails sent before a date threshold are not included in the training data.

8. An electronic device for detecting email phishing using deep learning, the electronic device comprising:
    a memory configured to store training email data including emails labeled as a phishing email or a non-phishing email, wherein:
        the emails include hypertext markup language (HTML) tags having a hierarchal structure; and
        the HTML tags include a tag name and a tag attribute;
    processor circuitry configured to:
        generate training data including the training email data by, for each of the emails included in the training email data:
            generating from the HTML tags of the email a directed acyclic graph (DAG) including nodes and an adjacency matrix, wherein:
                each node represents an HTML tag of the email and includes the tag name of the represented HTML tag, the tag attribute, and a cascading style sheets (CSS) value; and
                the CSS value is determined based on CSS properties of the email; and
            determining the adjacency matrix of the DAG by parsing the HTML tags of the email to form a parse tree, wherein:
                the adjacency matrix is a matrix of elements with each of the elements representing two of the nodes of the DAG as a node pair;
                each of the elements has a value indicating whether the two nodes of the node pair represented by the element are adjacent or not adjacent; and
                two nodes of a node pair are adjacent when both nodes are connected in the parse tree;
        stochastically train one or more graph neural networks using the generated training data, such that when the one or more graph neural networks is applied to an email, the one or more graph neural networks outputs a label for the email as a phishing email or a non-phishing email, wherein:
            the processor circuitry adds noise during the training of the one or more graph neural networks, such that the trained one or more graph neural networks are more robust against small changes in the training data;

receive a testing email having HTML tags; and apply the one or more trained graph neural networks to the testing email and output the label for the testing email as a phishing email or a non-phishing email.

9. The electronic device of claim 8, wherein the CSS value is based on whether CSS is provided for the email and, when CSS is provided for the email, whether CSS is provided as a URL address, as text, or in another manner.

10. The electronic device of claim 8, wherein:
the non-phishing emails of the training email data are labeled as an identified class selected from a set of two or more potential classes;
the trained one or more graph neural networks are configured to output a label for the email as a phishing email or a specific class of the set of two or more potential classes; and
the applying of the one or more trained graph neural networks to the testing email by the processor circuitry results in the outputting of the label for the testing email as a phishing email or one of a specific class of the set of two or more potential classes.

11. The electronic device of claim 10, wherein the label output by the one or more graph neural networks indicates a probability of the email being at least one of a phishing email or at least one of the set of the two or more potential classes.

12. The electronic device of claim 8, wherein the label output by the one or more graph neural networks indicates a probability of the email being a phishing email.

13. The electronic device of claim 8, further comprising applying a time-based weight to the training data, such that the training emails included in the training data having an earlier sent date have a smaller effect on the training of the one or more graph neural networks than the training emails having a more recent sent date.

14. The electronic device of claim 13, wherein training emails sent before a date threshold are not included in the training data.

15. A non-transitory computer readable memory having software embodied thereon for detecting email phishing using deep learning, wherein the executing of the software causes the processor circuitry to:
obtain training email data including emails labeled as a phishing email or a non-phishing email, wherein:
the emails include hypertext markup language (HTML) tags having a hierarchal structure; and
the HTML tags include a tag name and a tag attribute;
generate training data including the training email data by, for each email included in the email training data:
generating from the HTML tags of the email a directed acyclic graph (DAG) including nodes and an adjacency matrix, wherein:
each node represents an HTML tag of the email and includes the tag name of the represented HTML tag, the tag attribute, and a cascading style sheets (CSS) value; and the CSS value is determined based on CSS properties of the email; and
determining the adjacency matrix of the DAG by parsing the HTML tags of the email to form a parse tree, wherein:
the adjacency matrix is a matrix of elements with each of the elements representing two of the nodes of the DAG as a node pair;
each of the elements has a value indicating whether the two nodes of the node pair represented by the element are adjacent or not adjacent; and
two nodes of a node pair are adjacent when both nodes are connected in the parse tree;
stochastically train one or more graph neural networks using the generated training data, such that when the one or more graph neural networks is applied to an email, the one or more graph neural networks outputs a label for the email as a phishing email or a non-phishing email, wherein:
noise is added during the training of the one or more graph neural networks, such that the trained one or more graph neural networks are more robust against small changes in the training data;
receive a testing email having HTML tags; and
apply the one or more trained graph neural networks to the testing email and output the label for the testing email as a phishing email or a non-phishing email.

16. The memory of claim 15, wherein the CSS value is based on whether CSS is provided for the email and, when CSS is provided for the email, whether CSS is provided as a URL address, as text, or in another manner.

17. The memory of claim 15, wherein:
the non-phishing emails of the training email data are labeled as an identified class selected from a set of two or more potential classes;
the trained one or more graph neural networks outputs a label for the email as a phishing email or a specific class of the set of two or more potential classes; and
the applying of the one or more trained graph neural networks to the testing email results in the outputting of the label for the testing email as a phishing email or one of a specific class of the set of two or more potential classes.

18. The memory of claim 17, wherein the label output by the one or more graph neural networks indicates a probability of the email being at least one of a phishing email or at least one of the set of the two or more potential classes.

19. The memory of claim 15, wherein the label output by the one or more graph neural networks indicates a probability of the email being a phishing email.

20. The memory of claim 15, further comprising applying a time-based weight to the training data, such that the training emails included in the training data having an earlier sent date have a smaller effect on the training of the one or more graph neural networks than the training emails having a more recent sent date.

* * * * *